United States Patent [19]
Bayon et al.

[11] Patent Number: 5,561,675
[45] Date of Patent: Oct. 1, 1996

[54] LINEARLY POLARIZED FIBER-OPTIC LASER

[75] Inventors: Jean-François Bayon, Lannion; Marc Douay, Lille; Pascal Bernage, La Madeleine; Pierre Niay, Lambersart, all of France

[73] Assignee: France Telecom, Paris, France

[21] Appl. No.: 445,039

[22] Filed: May 19, 1995

[30] Foreign Application Priority Data

May 20, 1994 [FR] France ............................... 94 06215

[51] Int. Cl.$^6$ .................................................. H01S 3/30
[52] U.S. Cl. ........................... 372/6; 372/102; 372/105; 372/92; 372/27; 385/37; 385/96
[58] Field of Search ............................. 372/6, 105, 102, 372/92, 27, 96; 385/37

[56] References Cited

U.S. PATENT DOCUMENTS

| | | | |
|---|---|---|---|
| 5,305,336 | 4/1994 | Adar et al. | 372/96 |
| 5,317,576 | 5/1994 | Leonberger et al. | 372/102 |
| 5,323,404 | 6/1994 | Grubb | 372/102 |
| 5,473,622 | 12/1995 | Grubb | 372/6 |

FOREIGN PATENT DOCUMENTS 0524558  1/1993  European Pat. Off. .

OTHER PUBLICATIONS

Delevaque et al;"Gain Control in Erbium–Doped Fiber Amplifiers by Lasing at 1480 nm with Photoinduced . . . Fibre Ends",Electronics Letters, vol. 29,No.12,Jun. 1993, pp.1112–1114.

Proceedings SPIE, *Photosensitivity and Self–Organization in Optical Fibers and Waveguides*, Aug. 1993, vol. 2044, pp. 246–260; Douay et al., *Pump Power and Birfringence Effects in Nd3+ and Pr3+ Fiber Lasers Using Intra–Core Bragg Reflectors*, pp. 256–259.

Douay et al, *Birefringence Effect of Optical Fiber Laser with intracore Fiber Bragg Grating*, Aug. 1992, pp. 844–846.

Ball et al., *Continuously Tunable Single–Mode Erbium Fiber Laser*, Optical Letters, vol. 17, No. 6, Mar. 1992, pp. 420–422.

Delevaque et al., *Gain Control in Erbium–Doped Fibre Amplifiers by Lasing at 1480 nm With Photoinduced . . . Fibre Ends*, Electronic Letters, vol. 29, No. 12, Jun. 1993, pp. 1112–1114.

Primary Examiner—Leo Scott, Jr.
Attorney, Agent, or Firm—Nilles & Nilles, S.C.

[57] ABSTRACT

A fiber-optic laser comprising a birefringent optic fiber possessing a Bragg grating at each of its ends,. A light source emits a light beam having two modes of polarization in the fiber. The birefringence of the fiber makes it possible to keep the two polarization modes separate. The two Bragg gratings are photo-recorded in the fiber and are made in such a way that their resonance wavelength is matched for one polarization. The wave emitted by the fiber is then polarized linearly along P1. Applications to linearly polarized lasers for optical transmission, instrumentation, spectroscopy, medicine, the detection of chemical species and telemetry.

7 Claims, 2 Drawing Sheets

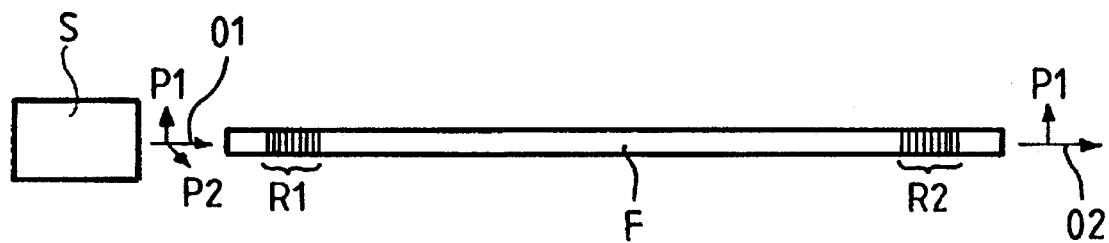
FIG_1

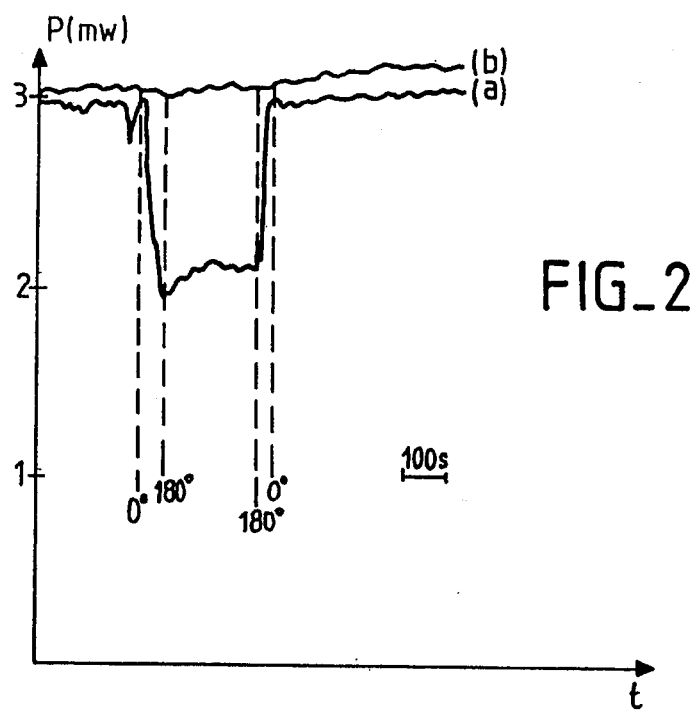
FIG_2
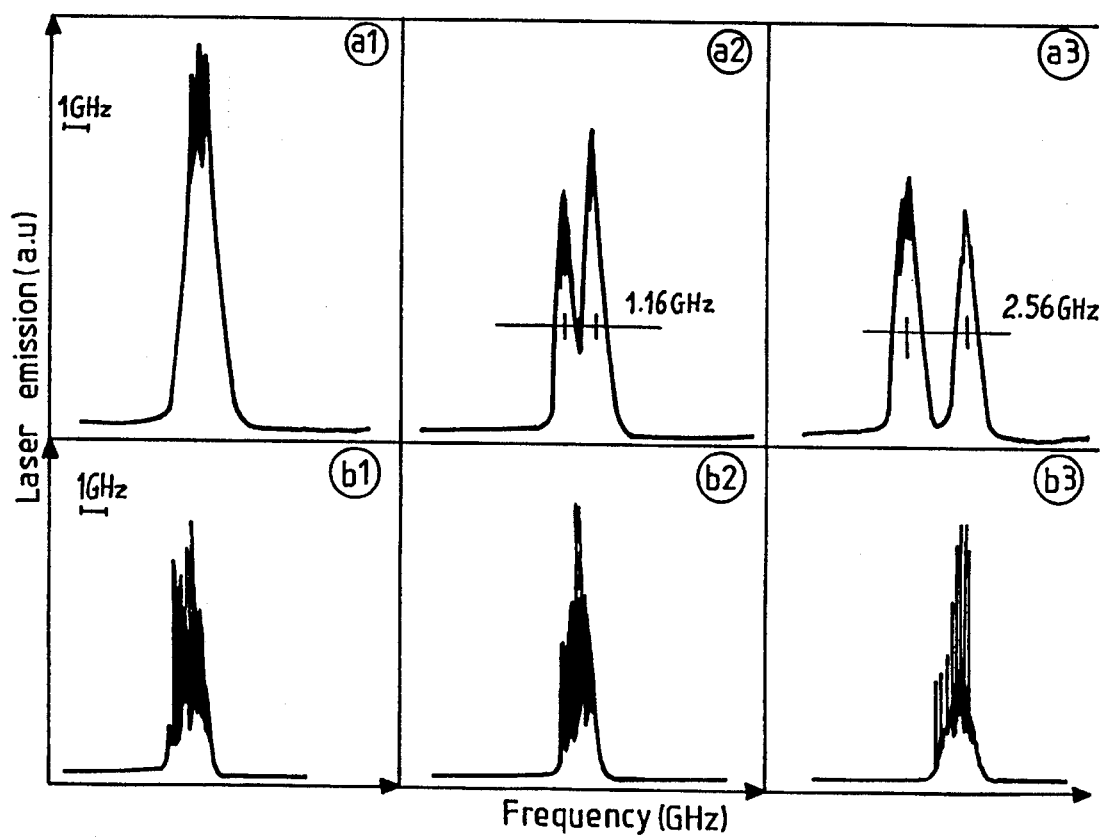
FIG_3

LINEARLY POLARIZED FIBER-OPTIC LASER

BACKGROUND OF THE INVENTION

1. Field of the Invention

The invention relates to a linearly polarized fiber optic laser.

As in all lasers, it may be useful and even necessary in certain applications to lave emission available that is linearly polarized in a stable direction of polarization.

The laser of the invention is therefore a fiber-optic laser that can be used to obtain an emission of a linearly polarized transversal monomode light wave. Such a laser is applicable to a large variety of fields such as telecommunications, optical transmission, instrumentation, spectroscopy, medicine, the detection of chemical species and telemetry.

2. Description of the Prior Art

The optical radiation of a laser emitting a transversal monomode beam is generally constituted by two groups of orthogonally polarized longitudinal modes. In a medium other than a vacuum, these modes have different resonance frequencies. The state of polarization of the emitted wave is random.

In fiber-optic lasers, external stresses such as pressure, vibrations and temperature variations may prompt refractive-index variations and polarization couplings. This may cause the power to vary with time in each polarization so that one polarizer is sufficient to obtain a polarized beam. The power at output of the polarizer may be subjected to random variations even if the total power at output of the laser (before the polarizer) remains constant.

Furthermore, the phenomena of couplings modify the resonance frequencies of the groups of longitudinal modes in an uncontrollable way. This effect proves to be troublesome for all the applications of lasers in which the emission frequency must remain fixed in the course of time.

In certain types of laser, the emission is naturally polarized or can easily be made to be polarized. These are cavities having a differential gain in the two natural modes of polarization. A well-known example of polarized emission is that of semiconductor lasers (GaAlAs) for which the anisotropy of gain due to the structure of the waveguide, associated with the homogeneous character of the transitions brought into play, provides for polarized emission. Another example of artificially polarized emission is that of gas lasers with Brewster plates enclosing the gaseous active element. These plates are designed both to prevent parasitic cavities and to introduce a sufficient differential loss in the two modes of linear polarization (since gas lasers have very low gains, a small difference of loss is sufficient).

The case of lasers doped fiber with rare earths is more particular. First of all, at ambient temperature, the emission lines have a predominant, non-homogeneous component. This permits the simultaneous oscillation of several wavelengths and modes of polarization. Hence the introduction, into these media, of a low differential gain on the natural states of polarization does not suffice to ensure emission rectilinearly polarized along a stable direction (a monopolarization emission actually occurs in the pumping zone ranging between the thresholds corresponding to the two polarizations, but it cannot be exploited in practice). Furthermore, in a conventional fiber, the state of polarization of the laser wave is highly sensitive to the external parameters and may vary rapidly and randomly.

SUMMARY OF THE INVENTION

It is an object of the present invention to overcome these drawbacks.

The invention therefore relates to a linearly polarized fiber-optic laser in which the fiber is polarization-maintaining birefringent fiber and has, at each of its ends, a photo-recorded Bragg grating.

The Bragg wavelengths of these gratings may be substantially equal. The two gratings may also be recorded in different conditions. In this case, the two gratings are made so as to present different values of divergence between the resonance peaks of the Bragg wavelengths corresponding to the two modes of polarization.

To produce a specified polarization, the Bragg wavelengths corresponding to one and the same polarization are placed in a state of coincidence for the two gratings.

According to another variant, it is also possible to provide for a device for the rotation of polarization by Π/2.

In this case, the Bragg wavelength corresponding to a first polarization in a grating is made to coincide with the Bragg wavelength corresponding to a second polarization orthogonal to the first one in the other grating.

BRIEF DESCRIPTION OF THE DRAWINGS

Other features and advantages of the invention shall appear from the description, given by way of a non-restrictive, illustrative example with reference to the appended drawings, of which:

FIG. 1 exemplifies an embodiment of the fiber-optic laser according to the invention;

FIGS. 2 and 3 are characteristic curves of a known laser and of a laser according to the invention.

MORE DETAILED DESCRIPTION

According to the invention, it is planned first of all to stabilize and process the polarizations separately. For this purpose, a polarization-maintaining birefringent fiber is used. For example, it is planned to use a fiber with birefringence of over $10^{-4}$. The degenerescence between (linear) polarization modes is then high enough for the coupling between these modes to be negligible under the habitual conditions of use of the fiber.

However, a small difference in gain is not enough to provide for a linearly polarized emission when the pumping rate is high.

According to the invention, it is planned to eliminate the cavity for one of the two modes of polarization.

FIG. 1 shows an exemplary embodiment of the invention.

A birefringent optical fiber F is provided, at each of its ends, with a photo-recorded (or photo-induced) grating R1, R2.

The making of such a grating is known in the prior art. It implements the interference between two optical waves. The interference figure creates refractive-index strata.

The gratings R1 and R2 are made so as to close the optical cavity only for a single polarization. These gratings work in Bragg conditions and, as in known in the prior art, they fulfil roles of mirrors of the cavity.

The wavelengths of resonance of a photo-recorded grating are different for each of the axes of birefringence and this difference may be made greater than the bandwidth of the grating. By achieving mastery, through an adequate method, over the resonance wavelengths of each of the gratings and by configuring the cavity (chiefly as regards the changes undergone by the polarization states), it is possible to obtain a power-stable monopolarization emission.

It is therefore necessary to obtain a frequency tuning between the two gratings that close the laser cavity for one of the natural states of polarization while at the same time seeing to it that these gratings will be mismatched for the other natural state of polarization.

In the particular embodiments described here below, the function of mirror of the cavity is therefore made by photo-recorded gratings. An essential characteristic means is therefore the manufacture and use of a polarization-selective cavity. A second critical point is the stability of the natural states of polarization with respect to external disturbances. For this purpose, a fiber with linear birefringence will be used.

According to one embodiment, the two photo-recorded gratings R1, R2 have the same pitch but may be chosen such that they do not have the same Bragg wavelength.

However, the same physical grating may have one resonance for an X polarization and one resonance for the Y polarization. There is a difference between the two Bragg wavelengths for the two polarizations, this being the case for a determined grating. Here below, this difference shall now be made to vary or change for the two gratings R1 and R2 in modifying the recording conditions for the two gratings.

The two gratings are designed to have very slightly different Bragg wavelengths. In this case, one of the gratings R1 will have $\lambda 1$ as its Bragg wavelength and the other grating R2 will have $\lambda 2$ as its Bragg wavelength. The optical wave gets propagated in the fiber with two orthogonal X and Y polarizations. The two gratings then have their Bragg wavelength very slightly offset with respect to the mean Bragg wavelength.

More specifically, it is possible to make the gratings R1 and R2 in such a way that the differences between the two resonance peaks of the Bragg wavelengths of the two X and Y polarizations are sufficient for the two gratings. This means that if, for the first grating R1, there is a difference $\delta \lambda 1$ between the Bragg resonance values for the X and Y polarizations, this difference is $\delta \lambda 2$ between the Bragg resonance values for the X and Y polarizations in the grating R2 with $\delta \lambda 2$ different from $\delta \lambda 1$. The term "sufficient" means that the differences between the two resonance peaks of the Bragg wavelengths of the two X and Y polarizations are greater than the bandwidth of the grating.

Then, between the two gratings, it is only the Bragg wavelength for a determined polarization (X for example) in one grating that is placed in a state of coincidence with the Bragg wavelength for the same polarization in the other grating.

Under these conditions, the Bragg wavelengths for the other polarization (Y polarization) cannot be placed in a state of coincidence for the two gratings.

According to another embodiment, the X and Y polarizations are made to rotate by $\Pi/2$, between the two gratings R1 and R2, within the fiber. This can be done by means of a filter playing the role of a polarization rotator or else by cutting the fiber and splicing the two cut pieces at the same place in positioning the two pieces rotate at 90° with respect to each other by making them rotate with respect to an axis perpendicular to the plane of the cross-section. Furthermore, in this embodiment, the gratings R1 and R2 are made in such a way that the mean Bragg wavelengths are offset slightly, and the resonance of the X polarization of the grating R1 is made to coincide with the Y resonance of the grating R2. An improved resolution is thus obtained on the polarizations.

According to another embodiment, it is planned to make the gratings R1 and R2 in such a way that their reflection rate is zero for an X polarization and the maximum for a Y polarization (or conversely).

The fiber used may be a fiber with a dissymmetrical structure, for example a fiber with a elliptical cross-sectioned core. The gratings R1 and R2 are made by the interference of two light waves and by irradiation by means of an ultraviolet radiation. The irradiation time of the two gratings is computed so as to obtain, for both gratings, a factor of maximum reflectivity for a polarization. The laser will therefore be polarized linearly since, for the other polarization, there will be no cavity.

FIG. 1 therefore shows the birefringent fiber with its two gratings R1, R2. A (laser) optical source gives a pump wave 01 having two orthogonal polarizations P1 and P2. As described here above, the optical fiber F gives, at output, a beam 02 linearly polarized along P1 for example.

The device according to the invention has been subjected to experiment. FIGS. 2 and 3 show two examples of the changes undergone by the characteristics of the laser emission in a conventional prior art configuration (curves "a") and in a configuration that is stabilized according to the invention (curve "b").

In each of the cases, an external parameter is made to vary (it is, for this experiment, an intra-cavity constraint).

FIG. 2 shows curves of the power emitted by the pumped laser as a function of time.

FIG. 3 shows graphs of emission in terms of frequency.

The curve "a" in FIG. 2 shows a high variation of power. The curves a1 a2 a3 of FIG. 3 show high variations of the oscillation wavelength.

By contrast, the curve b corresponding to the invention reveals, in FIG. 2, power stability and the curves b1 b2 b3 in FIG. 3 reveal an emission that is stable in wavelengths.

It is therefore clearly shown that the fiber-optic laser according to the invention can deliver an emission that is linearly polarized along a stable direction with constant power (>1 mW). It must be noted that the method used is entirely compatible with the making of monofrequency lasers (with only one longitudinal resonance).

The coefficients of reflection and the resonance wavelength of a photo-recorded grating in a fiber with high linear birefringence differs according to whether the light is polarized in parallel to the fast axis or the slow axis. The curves (b in FIGS. 2 and 3) have been obtained by the recording, in a birefringent fiber, of the gratings with different experimental conditions.

For example, a slight traction force on one of the gratings makes it possible to obtain the matching for one of the polarizations while, at the same time, being out of resonance for the orthogonal polarization, and the traction is kept to preserve this difference.

The birefringent fiber may be an assymmettrical core fiber. It may also be an asymmetrically stressed fiber known in the prior art, its structure being such that stresses are exerted asymmetrically on the core. This gives rise to differences in refractive index creating axes of propagation of different speeds, called the fast axis and the slow axis.

For example, the optical sheath of the fiber may be doped locally with boron. This modifies the expansion coefficients of the sheath. The core of the fiber may be doped with germanium, thus enabling the recording of a grating and the modification of the thermal expansion coefficients and, therefore, an increase in the dissymmetry of the stresses.

What is claimed is:

1. A fiber-optic laser pumped by a linearly polarized optical wave, comprising a birefringent optical fiber possessing a photo-recorded Bragg grating at each of its ends, wherein the optic fiber, possessing very high birefringence of over $10^{-4}$ shows two orthogonal modes of polarization, and wherein the two gratings are made so as to show sufficient differences between the two resonance peaks of the Bragg wavelengths corresponding to the two modes of polarization.

2. A fiber-optic laser according to claim 1, wherein the mean Bragg wavelengths of the two gratings are offset so that only the Bragg wavelengths corresponding to one and the same mode of polarization are put into a state of coincidence for the two gratings.

3. A fiber-optic laser according to claim 1, comprising a device for the rotation of polarization by $\Pi/2$ enabling the polarizations to be made to rotate by $\Pi/2$.

4. A fiber-optic laser according to claim 1, wherein the two gratings are made so that the resonance of a first polarization in a first grating R1 is made to coincide with the resonance of a second polarization perpendicular to the first polarization in the second grating R2.

5. A fiber-optic laser according to claim 1 wherein the two gratings show different coefficients of reflectivity for two orthogonal modes of polarization.

6. A fiber-optic laser according to claim 5, wherein the coefficients of reflectivity for a first mode of polarization are the maximum in both gratings and wherein they are the minimum for the second mode of polarization orthogonal to the first mode.

7. A fiber-optic laser according to claim 1, wherein the fiber is a fiber with a dissymmetrical structure and/or a fiber withstanding asymmetrical stresses.

* * * * *

US005561675C1

(12) EX PARTE REEXAMINATION CERTIFICATE (7619th)

United States Patent
Bayon et al.

(10) Number: US 5,561,675 C1
(45) Certificate Issued: Jul. 20, 2010

(54) LINEARLY POLARIZED FIBER-OPTIC LASER

(75) Inventors: Jean-François Bayon, Lannion (FR); Marc Douay, Lille (FR); Pascal Bernage, La Madeleine (FR); Pierre Niay, Lambersart (FR)

(73) Assignee: Gula Consulting Limited Liability Company, Dover, DE (US)

Reexamination Request:
No. 90/010,616, Jul. 24, 2009

Reexamination Certificate for:
Patent No.: 5,561,675
Issued: Oct. 1, 1996
Appl. No.: 08/445,039
Filed: May 19, 1995

(30) Foreign Application Priority Data

May 20, 1994 (FR) .......................................... 94 06215

(51) Int. Cl.
*H01S 3/06* (2006.01)
*H01S 3/067* (2006.01)
*H01S 3/098* (2006.01)

(52) U.S. Cl. ........................... 372/6; 372/102; 372/105; 372/92; 372/27; 385/37; 385/96

(58) Field of Classification Search ....................... 372/6
See application file for complete search history.

(56) References Cited

U.S. PATENT DOCUMENTS

| 5,305,336 A | 4/1994 | Adar et al. |
| 5,317,576 A | 5/1994 | Leonberger et al. |
| 5,323,404 A | 6/1994 | Grubb |
| 5,473,622 A | 12/1995 | Grubb |

FOREIGN PATENT DOCUMENTS

EP 0524558 A2 1/1993

OTHER PUBLICATIONS

Pureur, D. et al., "Single–Polarization Fiber Lasers Using Bragg Gratings in Hi–Bi Fibers", Journal of Lightwave Technology, vol. 1, No. 3, pp. 350–355, Mar. 1995.
Delevaque et al., "Gain Control in Erbium–Doped Fiber Amplifiers by Lasing at 1480 nm with Photoinduced Fiber Ends", Electronics Letters, vol. 29, No. 12, Jun. 1993, pp. 1112–1114.
Proceedings SPIE, Photosensitivity and Self–Organization in Optical Fibers and Waveguides, Aug. 1993, vol. 2044, pp. 246–260; Douay et al., "Pump Power and Birfringence Effects in Nd3+ and Pr3+ Fiber Lasers Using Intra–Core Bragg Reflectors," pp. 256–259.
Douay et al, "Birefringence Effect of Optical Fiber Laser with Intracore Fiber Bragg Grating," Aug. 1992, pp. 844–846.
Ball et al., "Continuously Tunable Single–Mode Erbium Fiber Laser," Optical Letters, vol. 17, No. 6, Mar. 1992, pp. 420–422.

*Primary Examiner*—Deandra M Hughes

(57) ABSTRACT

A fiber-optic laser comprising a birefringent optic fiber possessing a Bragg grating at each of its ends,. A light source emits a light beam having two modes of polarization in the fiber. The birefringence of the fiber makes it possible to keep the two polarization modes separate. The two Bragg gratings are photo-recorded in the fiber and are made in such a way that their resonance wavelength is matched for one polarization. The wave emitted by the fiber is then polarized linearly along P1. Applications to linearly polarized lasers for optical transmission, instrumentation, spectroscopy, medicine, the detection of chemical species and telemetry.

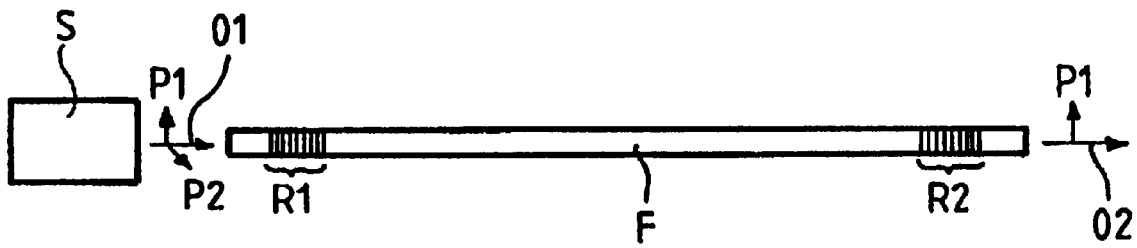

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-7 is confirmed.

\* \* \* \* \*